United States Patent [19]

Dahlstrand, Jr.

[11] 4,102,154
[45] Jul. 25, 1978

[54] TORQUE DISCONNECT SAFETY COUPLING

[76] Inventor: Josef Dahlstrand, Jr., 6736 E. 82nd St., Indianapolis, Ind. 46250

[21] Appl. No.: 709,939

[22] Filed: Sep. 7, 1976

[51] Int. Cl.² ............................ F16D 3/56; F16D 7/00
[52] U.S. Cl. ...................................... 64/29; 192/56 R; 192/104 C
[58] Field of Search .................. 192/56 R, 150, 104 C; 64/29

[56] References Cited

U.S. PATENT DOCUMENTS

| | | | |
|---|---|---|---|
| 2,781,118 | 2/1957 | Pechy | 192/150 |
| 2,930,212 | 3/1960 | Walterscheid-Müller | 64/29 |
| 3,010,728 | 11/1961 | Jennings | 64/29 |
| 3,132,730 | 5/1964 | Dahlstrand | 192/56 L |
| 3,593,542 | 7/1971 | Urayama | 64/29 |

*Primary Examiner*—Benjamin W. Wyche
*Assistant Examiner*—R. C. Turner

[57] ABSTRACT

A torque release coupling in which a coupling hub is connected to the shaft of a prime mover for rotation. The coupling hub acts as a driving member for a rotary member which comprises a coupling housing, in turn secured to a driven apparatus. The coupling housing is provided with a plurality of radial pistons and is provided with notch means therein for receiving a plurality of axial piston means with the piston means being provided with biasing means to urge the axial piston means into the notched means of the radial piston means. The coupling hub is provided with a cam means having cam pockets therein for receiving the inner end of the radial piston means. The radial piston means can be provided with weight means which cooperate with the axial piston means to provide a centrifugaly assisted torque disconnect coupling. The cam pocket means can have a ratchet configuration so that the disconnect coupling can operate in a unirotational direction and when rotated in the opposite or counterclockwise direction can reseat themselves in the cam pocket means without requiring manual resetting thereof.

9 Claims, 6 Drawing Figures

TORQUE DISCONNECT SAFETY COUPLING

The present invention relates to improvements in safety shaft couplings and more particularly to a torque responsive overload coupling which will normally maintain a driving and driven shaft in coupled engagement and will disconnect said shafts when the torque or overload approaches or exceeds a predetermined limit.

The present invention is an improvement over the inventor's U.S. Pat. No. 3,132,730.

Another object of the present invention is to provide a torque overload release coupling having weighted radial pistons cooperating with axial pistons to provide a torque disconnecting coupling in which the weighted radial pistons coact with the spring loaded axial pistons to provide a centrifugly assisted torque disconnect coupling.

It is another object of the present invention to provide a torque disconnect coupling provided with weighted radial piston means having a dog type configuration so that the coupling device will operate in a unirotational direction and engage corresponding cam pocket means when rotated in that direction and which will automatically reset themselves when the coupling is rotated in a counterclockwise direction.

It is still a further object of the present invention to provide a torque disconnect coupling having a plurality of radial pistons and coacting axial pistons in which the inner end of the radial pistons are provided with a dog like configuration so that the coupling will be engage in the corresponding cam pocket notch when rotated in a clockwise direction which will be disconnected when the coupling is rotated in a counterclockwise direction.

One object is to provide a torque overload release coupling which will automatically operate to disconnect a driving member from a driven member when the torque value exceeds a predetermined limit and to maintain said members disconnected or uncoupled after release until the cause of the overload has been detected and eliminated.

Another object is to provide a torque release coupling which can be adjusted to respond to torque overloads of various limits and torque conditions.

Another object is to provide a torque release coupling having radially movable pistons yieldingly held in an operative position which are moved outwardly and radially when the coupling is overloaded to release the pistons and will be held in a position in which the inner ends are out of engagement and contact with the notched cam member.

Another object resides in the provision of a torque release coupling which can easily be re-set and restored to its operative position after the overload conditions have been remedied.

Another object is to provide a novel cam collar having a series of cam notches and lobes arranged to project the yieldingly retained coupling pistons a short distance so that they may be locked against further radial movement upon coupling release to hold the inner ends of the coupling pistons out of engagement with the cam collar surface.

Another object is to provide a torque release coupling having radial coupling pistons provided with a pair of closely spaced notches for receiving a spring loaded detent axial piston engageable with the notches to alternately hold the coupling pistons in an operative position, and when the coupling is released to retain the pistons in an inoperative position and out of engagement with the cam collar thus preventing wear of the various parts by the elimination of rubbing contact therebetween.

Another object resides in the provision of a torque release coupling in which the spring loaded axial pistons are provided with calibrated regulating screws to increase and to permit all of the loading springs to be pre-set to a single calibrated setting and exert equal pressure on the respective axial pistons.

Another object is to provide an overload release clutch or coupling in which the cam collar or hub is so shaped as to move the coupling pistons a very short radial distance when the coupling is overloaded and released, and in which the cam surfaces are so shaped as to engage the beveled ends of the coupling pistons and move the same outwardly against the yielding action of the pistons which are again projected into the second notch of the coupling pistons to retain the coupling pistons in an inoperative position.

Other objects and advantages of the invention will become apparent during the course of the following description of the accompanying drawing wherein.

Figure 3:
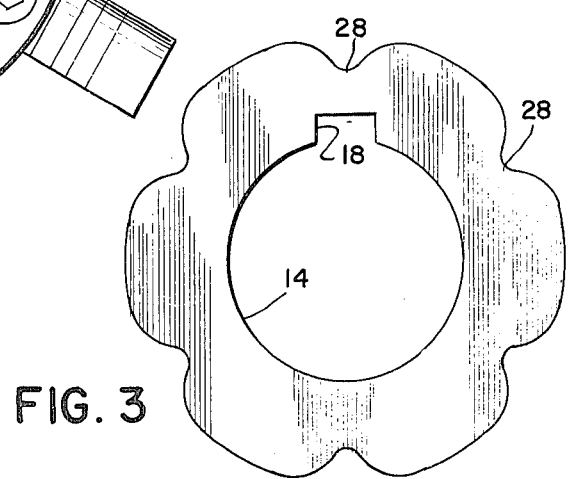
FIG. 3 is a front view of the configuration of the cam lobe illustrated in FIG. 1.

Referring to the drawings the reference numeral 10 generally designates the torque disconnect coupling embodied in the present invention. The coupling is provided with a coupling hub 12 which is the driving member and is provided with a central bore 14 having a keyway 18 therein, as best seen in FIG. 3 for receiving a driving shaft, not shown, of the prime mover such as an electric motor or internal combustion engine.

The coupling housing is provided with a bore 22 also with a keyway, not shown to which the shaft of a driven member such as a turbine or the like may be connected by any suitable well known means or, in the alternative the housing could be provided with a V-belt pulley groove such as that shown in U.S. Pat. No. 3,132,730 for the driven member.

Figure 1:
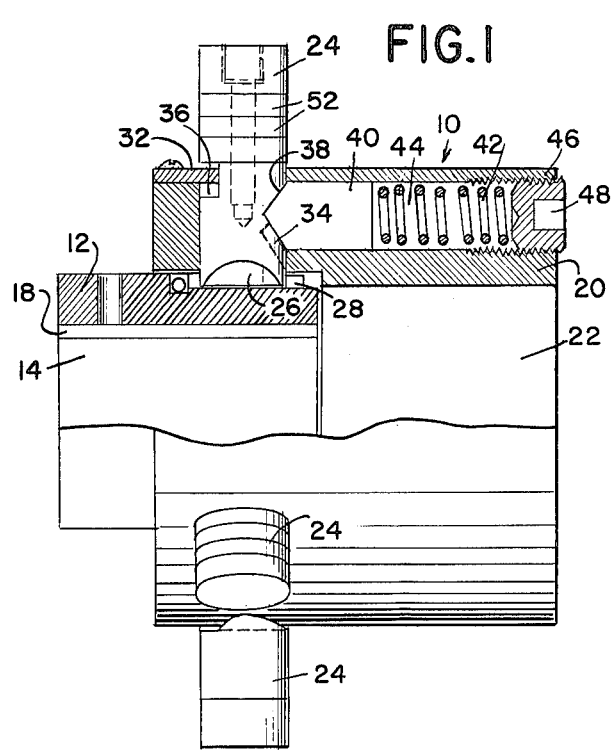
FIG. 1 is a side elevational view of the overload release coupling embodied in the present invention with parts broken away for purposes of clarity.
Figure 2:
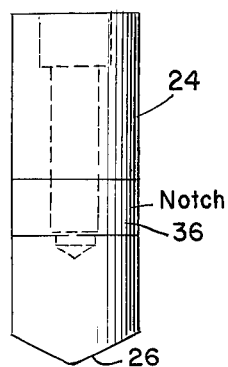
FIG. 2 is an enlarged front view of the weighted radial piston shown in FIG. 1.

The housing 20 is provided with a plurality of radial pistons 24 circumferentially spaced thereabout as best seen in FIG. 1. The cylindrical pistons are provided an inner cam radial piston tip 26 and extend through the housing and are adapted to be seated within corresponding cam lobes 28 of beveled configuration as best seen in FIG. 3.

Figure 4:
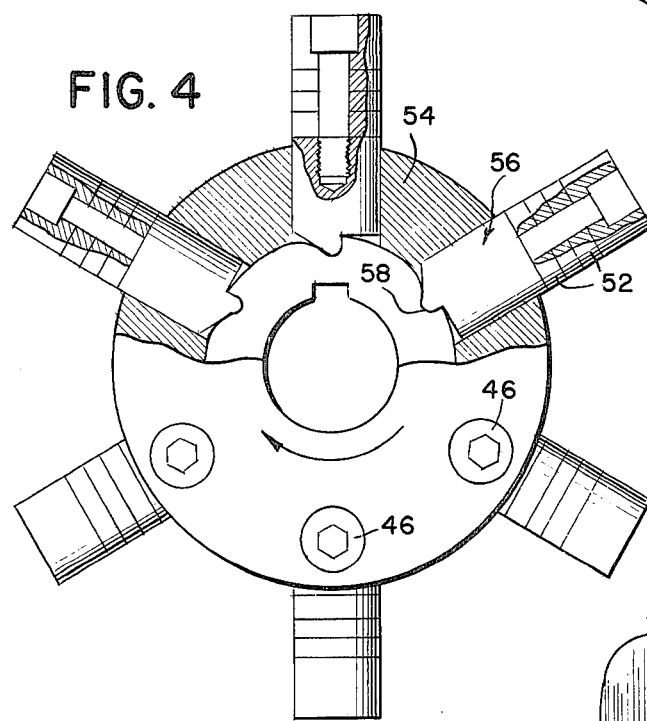
FIG. 4 is a front view of a modified embodiment of the invention illustrating the radial pistons having dog or pawl configurations for a unirotational torque disconnect coupling embodied in the present invention.
Figure 6:
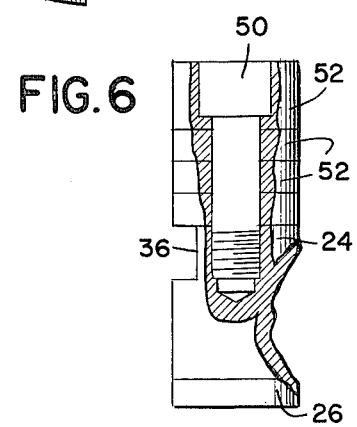
FIG. 6 is a detail view of the weighted radial piston illustrated in FIG. 1.

The cam is part of the hub 12 aligned with the radial pistons 24 so as to receive the curved or beveled inner end 26. The coupling housing is further provided with a shroud band 32 secured thereto by screws 34 or other similar means. The radial piston is further provided with a notch 36 in its outer end as best seen in FIGS. 1 and 6. There is also provided in the side opposite the notch 36 two closely spaced W detent notches 34 and 36 for receiving the similarly shaped tip 38 of the axial pistons 40. The axial pistons 40 are circumferentially spaced about the coupling housing 20 and are pushed by coiled springs in the axial cylinders 44 in which the axial pistons are disposed. The axial cylinders 44 have a threaded plug securing the coil springs therein and are provided with a recess 48 to receive an Allen wrench. The housing 20 may be provided with desired graduations, as best seen in FIG. 4 enabling all of the screw plugs 46, as best seen in FIG. 4 to be adjusted a corresponding amount to exert equal pressure on the cooperating compression or coil springs 42.

The radial pistons 24 are provided with a headed screw 50, shown in FIG. 6 threaded therein to receive a plurality of annular weights 52 thereon. The number of weights that are to be disposed on the radial pistons is predetermined in order to provide a centrifugally assisted torque diconnect coupling which cooperates with the compression springs bearing against the axial pistons 40, as hereinafter described.

Figure 5:
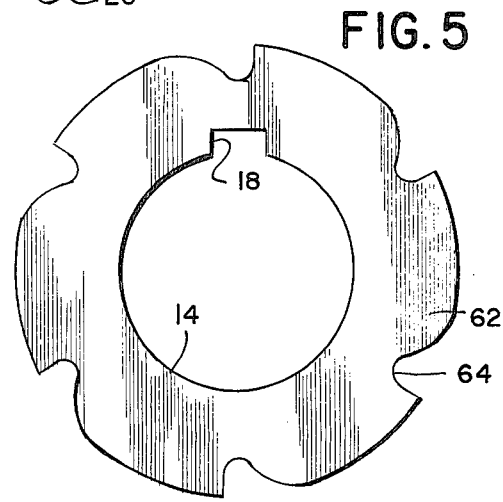
FIG. 5 is an view of the cam lobe shown in FIG. 4.

Referring to the embodiment of the invention shown in FIGS. 4 and 5, this is substantially the same as that described in connection with FIG. 1 except that the housing has radial pistons 56 with a different inner profile 58. Although FIG. 4 illustrates the piston 56 as having weights 58 thereon similar to that described in connection with FIG. 1 it is not necessary to use this type of weighted radial piston but the pistons may be the same as those described and shown in my earlier U.S. Pat. No. 3,132,730. In the embodiment of the invention of FIG. 4, this is a unirotational torque disconnect coupling. The profile 58 of the pistons 56 are machined so that when the hub 54 is rotating in a clockwise direction and the axial spring pressure caused by the said springs 42 acting on the axial pistons 40 sufficient to allow the radial pistons 56 out of the cam pocket and up the cam surface and along the outside diameter of the cam, all of the radial pistons 56 will rise simultaneously, and will reset in adjacent pockets similar to dogs in a simple ratchet. In this embodiment of the invention for a unirotational unit, only a single notch for the axial pistons 56 is used and not the double notch described in connection with the embodiment shown in FIG. 1. The cam 62 is provided with corresponding profiles 64, as best seen in FIG. 5, to receive the profiles 58 of the pistons 56.

In the operation of the embodiment of the operation as shown in FIG. 1, the radial pistons 24 are provided with the desired number of weights 52 thereon to provide a predetermined weight for a centrifugally assisted torque disconnect coupling. At this time the axial pistons 50 are engaged in outer part of the W detent 34 as best seen in FIG. 1. A driving shaft, not shown is disposed in the central recess 14 of the driving hub 12. The inner ends 26 of the radial pistons are disposed in the cam lobes 28 so that the hub 12 will drive the rotary coupling housing 20. The shaft, not shown, disposed in the bore 14 may be an electric motor or an internal combustion engine or the like. Another shaft is disposed in the housing bore 22 and connected to a driven apparatus also not shown. Under driving conditions, the radial pistons 24 are maintained in their cam lobes 28 by the spring loaded axial pistons 40 and will be held in place for normal driving loads.

Upon an overload on the cylindrical rotary housing body 20 imposed thereon through a shaft, not shown, in the bore 22, the radial pistons 24 will be moved radially outwardly during a torque overload and into the outer radial notches, as shown in FIG. 1. At this time the plungers 40 are held in a release position with the profiles or edges 38 disposed in the outer radial notches so that the radial plungers 24 will be out of engagement with the lobes 28 in the cam 30. The radial pistons 24 are prevented from being centrifugally thrown out of the coupling by virtue of the shroud 32 extending into the notches 36 of the radial pistons. With the weights 52 in place on the radial pistons 24, the torque capacity of the coupling decreases as the speed of rotation increases. Torque capacity can easily be doubled at start up, from that figure which it has at motor speed. This reduction in torque carrying capacity is caused by centrifugal force acting on the radial pistons 24. This force is pulling on the radial pistons at the same time that the cam forces from the relative rotation between the hub 12 and housing 20, are pushing on the radial pistons. The radial piston and springs 42 are, in effect, required to overcome double forces with this arrangement. A shroud band 32 and special notch 36 is machined in the radial pistons to allow outward radial movement of the radial pistons but NOT COMPLETE ESCAPE from the housing. This is a necessary safety feature for any rotating machinery.

Thus, there are two distinct forces, easy to calculate, work together to cause this unit to disconnect at preset torques and pre-set speeds, first, the torque induced by relative rotary motion between the cam hub and the coupling housing through the cam and radial piston arrangement, and second, the centrifugal force pulling at the weighted pistons. Both of these forces resisted by the torques springs and axial piston arrangement. By varying the weights which are attached to the radial pistons, the coupling can be made to carry a wide variety of torques at any given motor speed.

Referring to the unirotational torque disconnect coupling shown in FIGS. 4 and 5, this operates substantially in the same way as that already described in connection with the pistons of the embodiment in FIG. 1. However, when the driving hub with the cam 62 is rotated in a clockwise direction, as indicated by the arrow in FIG. 4, when there is a torque overload and the plungers 40 are moved to the right angle profiles 58 will move up the cam surface and along the outside diameter of the cam 62 and will reseat in adjacent cam pockets or profiles 64, similar to dogs in a simple ratchet. For this unirotational coupling, only a single notch 34 for the axial pistons 40 is used. The double notch radial pistons already described for the coupling shown in FIG. 1 must be manually reset when they disconnect whereas the radial pistons 56 in FIG. 4 will automatically reset themselves. Although the embodiment of the invention shown in FIG. 4 uses weighted radial pistons 56, similar to those shown in FIG. 1, the radial pistons may also be of the conventional type shown and described in my U.S. Pat. No. 3,132,730.

An advantage of this unirotational disconnect coupling is that it can be used with a drill rig with an expensive bit such as is used in drilling an oil or gas well. When the drill jams and the coupling disconnects at a pre-set torque, reversing the direction of the drive, causes this coupling or unit to positively lock and disengage the stuck drill bit.

Thus, this invention provides automatically adjusted torque capacity to a torque disconnect coupling where static torque exceeds the running torque, in an accurate and predictable fashion while the unit is in operation. This is important because in many cases, if not most, the start-up torque is higher than the desired running torque. Weighted radial pistons, urged by centrifugal force and acting in concert with the cam and piston arrangement make this centrifugally assisted torque disconnect coupling a unit of high universal appeal to the power transmission industry.

Inasmuch as various changes may be made in the relative arrangement, form and location of the parts without departing from the spirit and scope of the invention, it is not meant to limit the invention except by the appended claims.

What is claimed is:

1. In a torque release coupling; a drive hub, having a cylindrical outer periphery with circumferentially spaced cam lobes therein, a driven rotary member comprising an annular housing circumferentially spaced about said hub and adapted to be driven thereby, a radial piston slidably disposed in a radial bore in said housing and having an inner end for engagement in said cam lobes for releasably engaging and locking said hub and housing in driving relation, said inner end being shaped to conform to the profile of said cam lobe, said housing having an axial bore intersecting said radial bore with a slidable axial piston disposed therein, said radial piston having notch means therein facing said axial piston, said axial piston having an end to conform to said notch means and adapted to be engaged in said notch means when said hub and housing are engaged in said notch mean when said hub and housing are engaged in driving relation to resist the torque, adjustable biasing means disposed in said axial bore normally urging said axial piston into engagement with said radial piston when the torque is below a predetermined value, said radial piston extending externally outside of the periphery of said housing and having adjustable and detachable weight means disposed on the externally extending portion to permit readily changing of said weights for varying the centrifugal force causing the inner end of the radial piston into said cam lobe, and means preventing said radial piston from being released from the housing when a predetermined torque overload is exceeded comprising shroud means secured to said housing with a portion thereof extending into a recess disposed in said radial piston; whereby said axial piston and radial piston coact to maintain the hub and housing in engagement with each other when the torque is below a predetermined value.

2. The release coupling of claim 1 wherein said radial piston has a threaded member inserted into the outer portion thereof.

3. The release coupling of claim 1 wherein said adjustable biasing means is a spring member and a plug member maintains it bearing against said axial piston.

4. The release coupling of claim 1 wherein said notch means comprise two recesses contiguous to each other forming a W - shape.

5. In a unirotational torque release coupling, a drive hub, having a cylindrical outer periphery with circumferentially spaced cam lobes therein, said cam lobes having a portion of their profile forming a ratchet pocket in the direction of rotation, a driven rotary member comprising an annular housing circumferentially spaced about said hub and adapted to be driven thereby, a radial piston slidably disposed in a radial bore in said housing and having an inner end for engagement in said cam lobes for releasably engaging and locking said hub and housing in driving relation, said inner end being shaped to conform to the profile of said cam lobe, said housing having an axial bore intersecting said radial bore with slidable axial pistons disposed therein, said radial piston having notch means therein facing said axial piston, said axial piston having an end to conform to said notch means and adapted to be engaged in said notch means when said hub and housing are engaged in driving relation to resist the torque, adjustable means disposed in said axial bore normally urging said axial piston into engagement with said radial piston when the torque is below a predetermined value, said radial piston extending externally outside of the periphery of said housing and having adjustable and detachable weight means disposed on the externally extending portion to permit readily changing of said weights for varying the centrifugal force causing inner end of the radial into said cam lobe and means preventing said radial piston from being released from the housing when a predetermined torque overload is exceeded comprising shroud means secured to said housing with a portion thereof extending into a recess disposed in said radial position.

6. The release coupling of claim 5 wherein said notch means comprises a single recess.

7. In a unirotational torque release coupling, a drive hub having a cylindrical outer periphery with circumferentially spaced cam lobes therein, said cam lobes having a portion of their profile forming a ratchet pocket thereon in the direction of rotation, a driven rotary member comprising an annular housing circumferentially spaced about said hub and adapted to be driven thereby, radial piston slidably disposed in a radial bore in said housing and having an inner end for engagement in said cam lobes for releasably engaging and locking said hub and housing in driving relation, said inner end being shaped to conform to the profile of said cam lobe, said housing having an axial bore intersecting said radial bore with a slidable axial piston disposed therein, said radial piston having an end to conform to said notch means and adapted to be engaged in said notch means when said hub and housing are engaged in driving relation to resist the torque, adjustable biasing means disposed in said axial bore normally urging said axial piston into engagement with said radial piston when the torque is below a predetermined value, said radial piston extending externally outside of the periphery of said housing and having adjustable and detachable weight means disposed on the externally extending portion to permit readily changing of said weights for varying the centrifugal force causing inner end of the radial into said cam lobe, and means preventing said radial piston from being released from the housing when a predetermined torque overload is exceeded comprising shroud means secured to said housing with a portion thereof extending into a recess disposed in said radial piston whereby said axial piston and metal piston coact to maintain the hub and housing in engagement with each other when the torque is below a predetermined value.

8. The release coupling of claim 7 wherein said notch means comprises a single recess.

9. The release coupling of claim 8 wherein said biasing means is a spring member.

* * * * *